US009403646B1

(12) United States Patent
Huebner et al.

(10) Patent No.: US 9,403,646 B1
(45) Date of Patent: Aug. 2, 2016

(54) PALLETIZER WITH CONFIGURABLE DIVERTER AND TURN LANES FOR PATTERN FORMATION (71) Applicant: Columbia Machine, Inc., Vancouver, WA (US)

(72) Inventors: William Huebner, Ridgefield, WA (US); Kevin Meckel, Lake Oswego, OR (US); Patrick O'Connor, Ridgefield, WA (US); Timothy Hansen, Lake Oswego, OR (US)

(73) Assignee: COLUMBIA MACHINE, INC., Vancouver, WA (US)

( * ) Notice: Subject to any disclaimer, the term of this patent is extended or adjusted under 35 U.S.C. 154(b) by 0 days.

(21) Appl. No.: 14/726,107

(22) Filed: May 29, 2015

(51) Int. Cl.
*B65G 47/244* (2006.01)
*B65G 47/28* (2006.01)
*B65G 47/68* (2006.01)

(52) U.S. Cl.
CPC .............. *B65G 47/244* (2013.01); *B65G 47/28* (2013.01); *B65G 47/682* (2013.01); *B65G 2203/0225* (2013.01); *B65G 2203/0233* (2013.01); *B65G 2811/0626* (2013.01)

(58) Field of Classification Search
CPC .... B65G 47/244; B65G 47/28; B65G 47/086; B65G 47/682; B65G 2203/0225; B65G 2203/0233; B65G 2811/0605; B65G 2811/0626
USPC ...................................... 198/416, 410, 890.1
See application file for complete search history.

(56) References Cited

U.S. PATENT DOCUMENTS

| 3,332,531 | A | * | 7/1967 | Chaney | B65C 9/06 156/DIG. 27 |
|---|---|---|---|---|---|
| 4,930,615 | A | * | 6/1990 | Nash | B65G 47/244 198/411 |
| 5,320,478 | A | * | 6/1994 | Gonsowski | B65G 47/66 198/374 |
| 5,967,292 | A | * | 10/1999 | Corrales | B65G 47/244 198/379 |
| 6,032,782 | A | * | 3/2000 | Sampson | B65G 47/244 198/374 |
| 6,126,383 | A | * | 10/2000 | Franklin | B65G 47/2445 198/374 |
| 6,315,103 | B1 | * | 11/2001 | Boucherie | A46D 3/085 198/395 |
| 6,499,583 | B1 | * | 12/2002 | Sohlberg | B65G 47/086 198/374 |
| 6,935,484 | B2 | * | 8/2005 | Davis | B65G 47/244 198/411 |
| 8,147,177 | B2 | * | 4/2012 | Huber | B65G 47/086 198/461.1 |

* cited by examiner

*Primary Examiner* — Leslie A Nicholson, III
*Assistant Examiner* — Keith R Campbell
(74) *Attorney, Agent, or Firm* — Schaffer IP Law, LLC (57) ABSTRACT

A flexible pattern-forming palletizing apparatus includes a conveyor having an upstream end for receiving products along a single lane and a downstream end having a plurality of moveable lanes under computer control arrayed along a width of the downstream end. A diverter is positioned between the upstream and downstream end for moving the products from the single lane into selected ones of the plurality of lanes as the products move from the upstream end to the downstream end of the conveyor. A product turner is positioned downstream of the diverter for receiving products positioned in the plurality of lanes and turning selected ones, where the product turner includes turning devices that move between lanes under control of the computer and can be accurately positioned to optimize case turning for a wide array of product.

18 Claims, 8 Drawing Sheets

PALLETIZER WITH CONFIGURABLE DIVERTER AND TURN LANES FOR PATTERN FORMATION

BACKGROUND OF THE INVENTION

This invention relates generally to palletizers and more particularly to means for forming configurable patterns of product during the palletizing process.

Conveyor systems and palletizers are constructed to quickly move products from an upstream location to a palletizer section in which the product is arranged and stacked in layers for packaging and transport. There are various patterns of stacking that improve the stability of the load on the pallet. For instance, when stacking rectangular cases of consumer goods or bags of various material, the first layer of cases are arranged lengthwise along the back of the pallet and a row of cases are arranged sideways along the front of the pallet. In the next layer, the arrangement is reversed so that the back of the pallet has cases arranged sideways and the front has cases arranged lengthwise. This pattern of alternating layers is repeated until the pallet is fully loaded and the load wrapped for transport.

Pattern formation requires that the cases be properly positioned at the appropriate x-y location on the layer and in the needed orientation. This pattern formation is complicated by the fact that there may be many such patterns required for various goods and that variations in case sizes may require customized configuration of the palletizing equipment. That is, while conveyors are typically linear and have a single lane along which goods pass, cases within a palletized layer would have to be laterally positioned differently from adjacent cases. This may require lateral movement of the downstream end of the single-lane conveyor or, alternately, movement of the case to a fixed lateral lane along a multilayer conveyor. Such cases, however, would still need to be turned in order to properly orient the cases within the pallet layer.

Stacking with alternate rows improves the stability of the pallet because seams are overlaid and the cases contact multiple cases on adjacent layers. This in contrast with stacking using the same pattern where each case is in a single uniform column of such cases that are not stabilized by overlapping and thus stand a greater chance of collapsing.

One problem with stacking with alternating layers is that the orientation of the cases must be necessarily turned so that the product can be placed in either lengthwise or sideways fashion on the pallet. While such turning had been done manually, more modern equipment turn product using automated turners such as U.S. Pat. No. 6,032,782, owned in common by the assignee of the present invention. The turners operate by driving the product against a turning surface that is off axis to the direction of movement of the product along the conveyor. This causes the product to pivot around the turning surface so that it rotates ninety degrees. Such turners are typically static, however, and are fixed within a particular conveyor lane. As a result, there must be a different turner for each lane of a conveyor and pattern formation is limited to a particular preset pattern rather than dynamic as might be required when stacking products of different sizes or configurations.

A need arises, therefore, for a more flexible approach so that product turning can be dynamically controlled and multiple patterns formed using only a limited number of turning devices.

SUMMARY OF THE INVENTION

In a first aspect, the invention comprises a dynamically adjustable product turning apparatus. The apparatus includes a framework configured to span over a conveyor that moves product to multiple lanes of a conveyor surface from an upstream side to a downstream side. A plurality of turning bodies, with an actuator coupled thereto, are spaced along the framework and moveable between an inactive position to an active turning position within a selectable lane of the product to be turned. A computer control is coupled to the actuator and to the turning means and includes a programmed pattern in memory for moving each of the turning means along the framework and between the inactive and active positions. The turning bodies are configured to move vertically and/or horizontally between, into, or out of lanes to place the bodies in an inactive position out of the lane of the product to be turned, or in an active position within the lane of the product to be turned.

The invention further includes a conveyor/palletizer assembly. The assembly includes a conveyor having an upstream end for receiving products along a single lane and a downstream end having a plurality of lanes arrayed along a width of the downstream end. A diverter is positioned between the upstream and downstream end for moving the products from the single lane into selected ones of the plurality of lanes as the products moves from the upstream end to the downstream end of the conveyor. In a preferred embodiment, the diverter includes multiple tracks with each having independently moveable downstream ends so that the case can be positioned by a respective track at an infinite lateral position along the conveyor. A product turner is positioned downstream of the diverter for receiving products positioned in the plurality of lanes and turning selected ones under control of a computer responsive to a desired palletizing pattern. The product turner includes turning bodies that move between lanes under control of the computer. In this way, a case can be delivered to any lateral position along the discharge of a lane diverter and oriented as desired by the product turner.

Also described is a method for turning product as it moves along a conveyor from an upstream section of the conveyor to a downstream section. The product is diverted from a single upstream lane to one of a plurality of downstream lanes arrayed along a downstream width of the conveyor. While the product is being diverted from the single upstream lane to one of the plurality of downstream lanes, turning device is moved along a downstream width of the conveyor under computer control responsive to a desired palletizing pattern so that a turning surface of the turning device is interposed within a selected one of the downstream lanes. A product to be turned would then contact the turning surface of the turning device at a product contact position that is off-axis to a central axis of the product.

The configurable laner and turner as implemented use only a limited number of tracks and turning shoes but are capable of delivering product to a nearly infinite variety of lateral positions and desired orientations. In a palletizing apparatus, the combination enables the possibility of automating the palletizing process under computer control to create any layer and stacking pattern.

The foregoing and other objects, features and advantages of the invention will become more readily apparent from the following detailed description of a preferred embodiment of the invention that proceeds with reference to the accompanying drawings.

DETAILED DESCRIPTION

Figure 1:
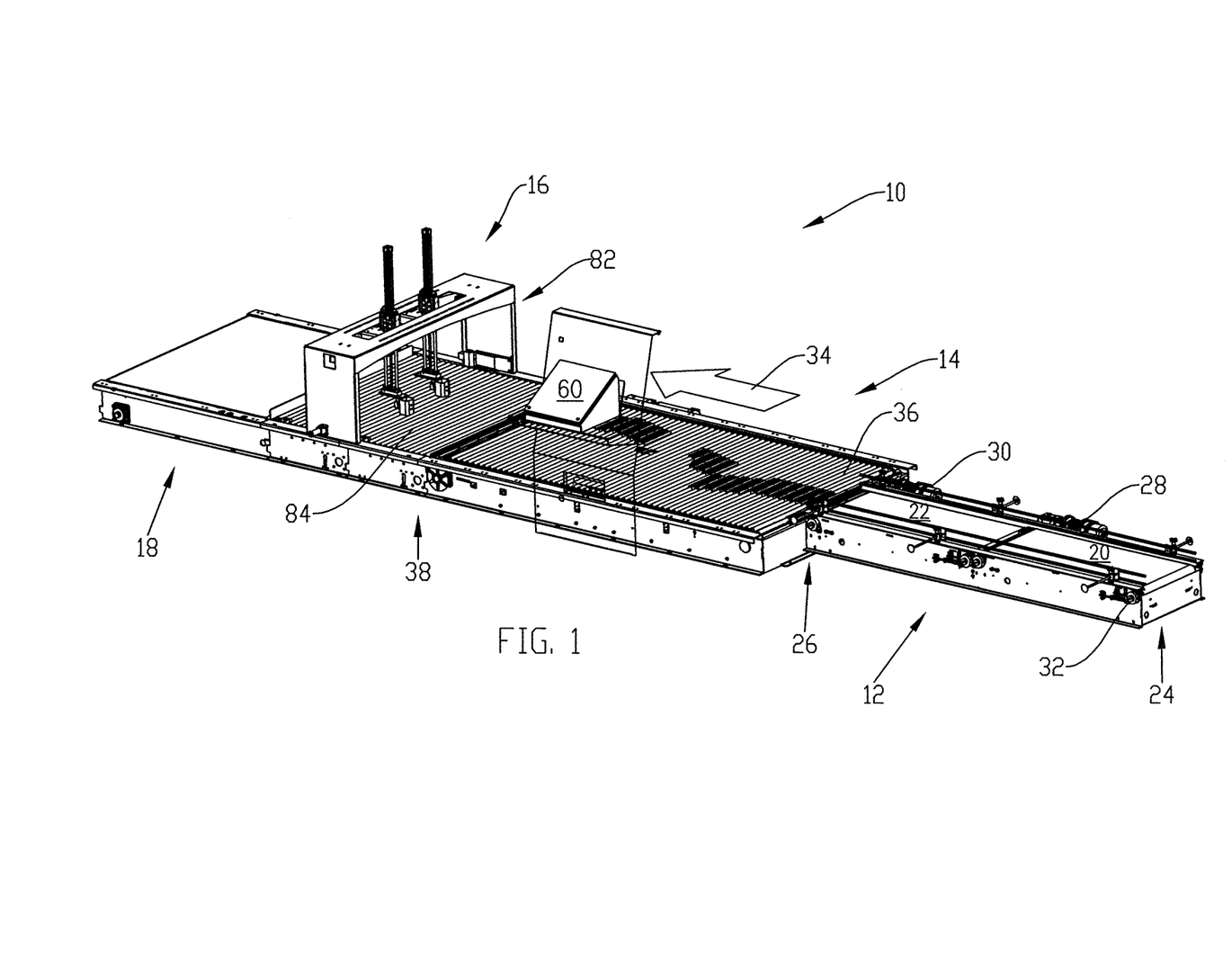
FIG. 1 is a perspective view of the conveyor/palletizer assembly as configured according to a preferred embodiment of the invention.
Figure 2:
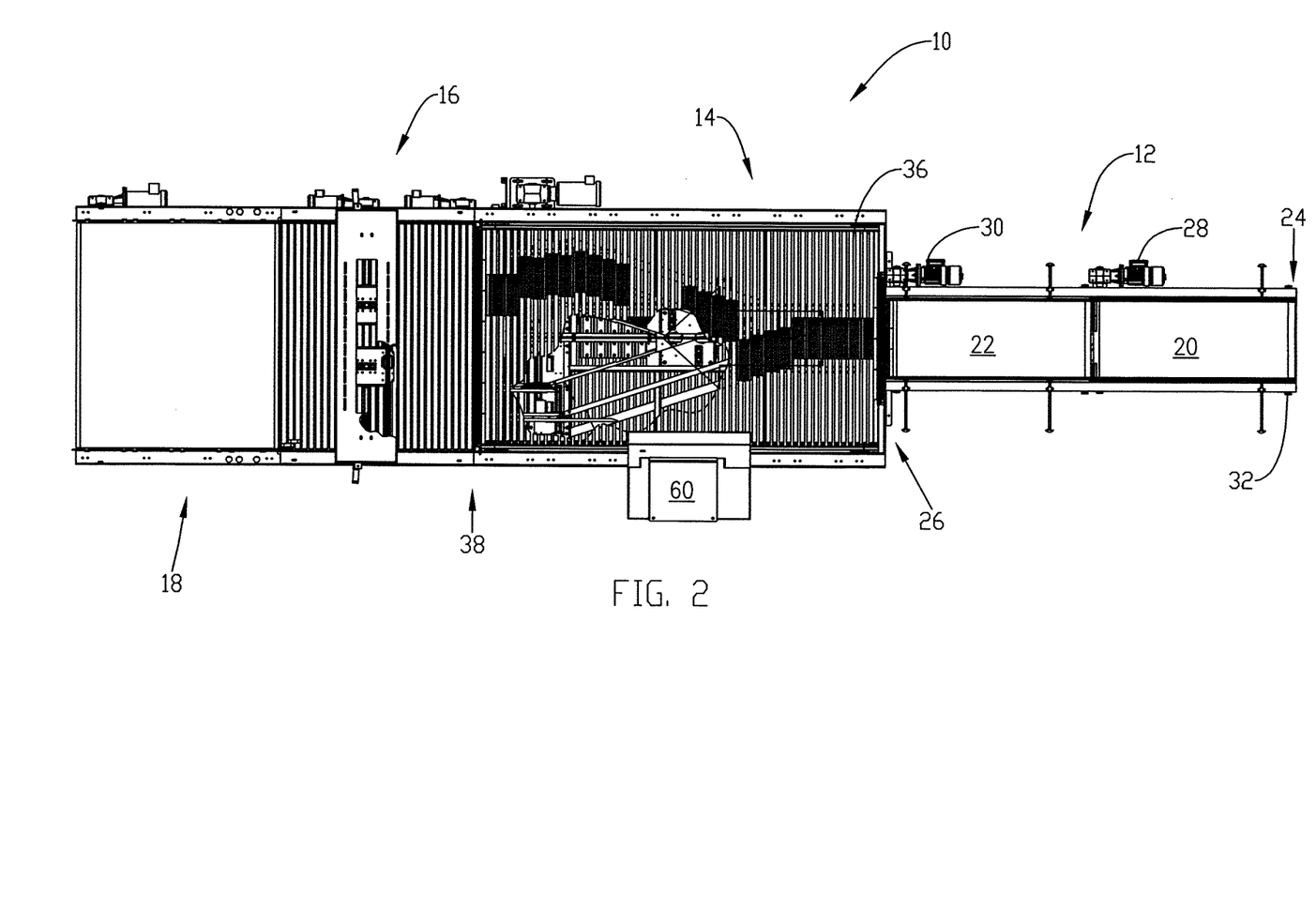
FIG. 2 is top plan view showing the conveyor/palletizer assembly of FIG. 1 with a partial section showing the interior of the diverter assembly.

FIGS. 1 and 2 show the palletizing assembly 10 as including an upstream linear conveyor 12, a lane diverter assembly 14, a product turning assembly 16, and ending at the downstream palletizer platform 18.

Conveyor 12 can be of a conventional type as shown and include conveyor belts 20, 22 forming a single lane conveyor surface upon which product is transported from an upstream end 24 to a downstream end 26 of conveyor 12. The belts 20, 22 move under operation of respective motors 28, 30 and rotate rollers—such as roller 32—so that the top surfaces of the belts move forwardly 34. One purpose for using multiple upstream conveyors 20, 22 is to create gaps between successive conveyed cases prior to delivery to the lane diverter assembly 14. For instance, belt 22 may be driven faster than belt 20 so that a minimum gap between one case and a case immediately behind it is created. By ensuring this gap, the lane diverter assembly 14 has the required time between cases to shift from one lane to another lane.

The downstream 26 of conveyor 12 abuts with the upstream end of lane diverter assembly 14 so that a product enters diverter 14 in one lane—e.g. a center lane 44 (FIG. 4)—and is maintained or moved under control of workstation 60 to another lane. The lane diverter assembly 14 includes means, such as those discussed further below, for moving product laterally along the width W of the diverter surface 36 to one of a plurality of lanes—e.g. center lane 44 or to a different lane such as outside right lane 40, middle-right lane 42, middle left lane 46, or outside left lane 48—as the product moves forwardly 34 to a terminal end 38 of the diverter assembly 14. In operation, product moves along a plurality of pathways, such as along center pathway 50 or the other diverted pathways 52, 54, 56, 58 into the respective lanes.

Figures 7A, 7B, 7C:
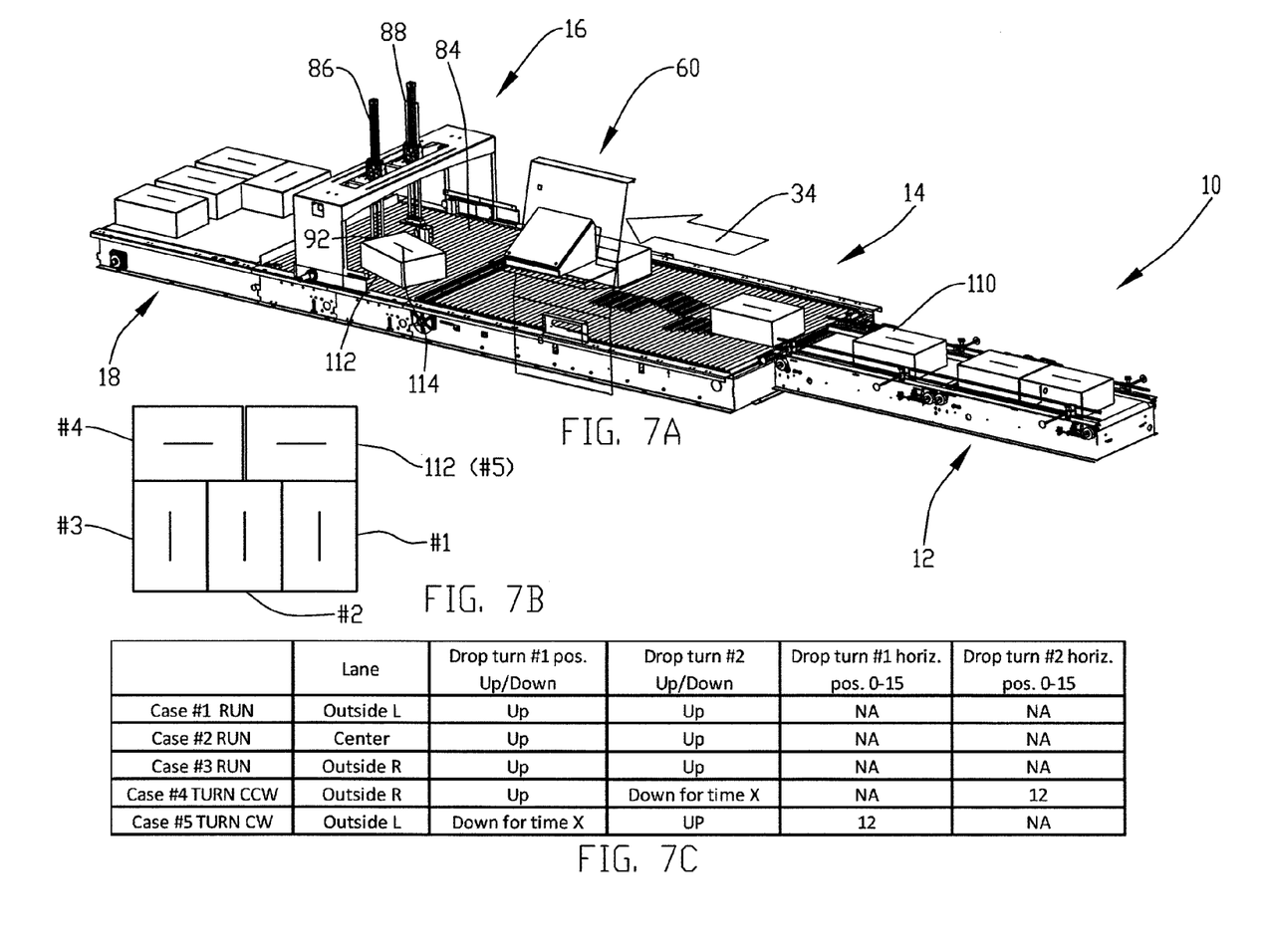
FIGS. 7A-7C show a perspective view of the palletizing assembly in operation to form the illustrated 5-case pattern using the instructions table shown.

Workstation 60 includes stored thereon a plurality of stacking patterns and instructions for controlling the operation of the diverter 14 and turner 16. Examples of such patterns and instructions are shown in FIGS. 7C and 8C which are discussed further below. The instructions operate to move products received from conveyor 12 onto the upstream portion of the center lane 44 of diverter 14 and thence to a programmed one of the plurality of lanes 40, 42, 44, 46, or 48 as the products move from the upstream end to the downstream end of the diverter 14. The instructions further operate to move portions of the turner 16 within or between lanes to selectively turn certain ones of the products as desired to achieve a particular pattern layer for the palletizing stack.

Figure 3:
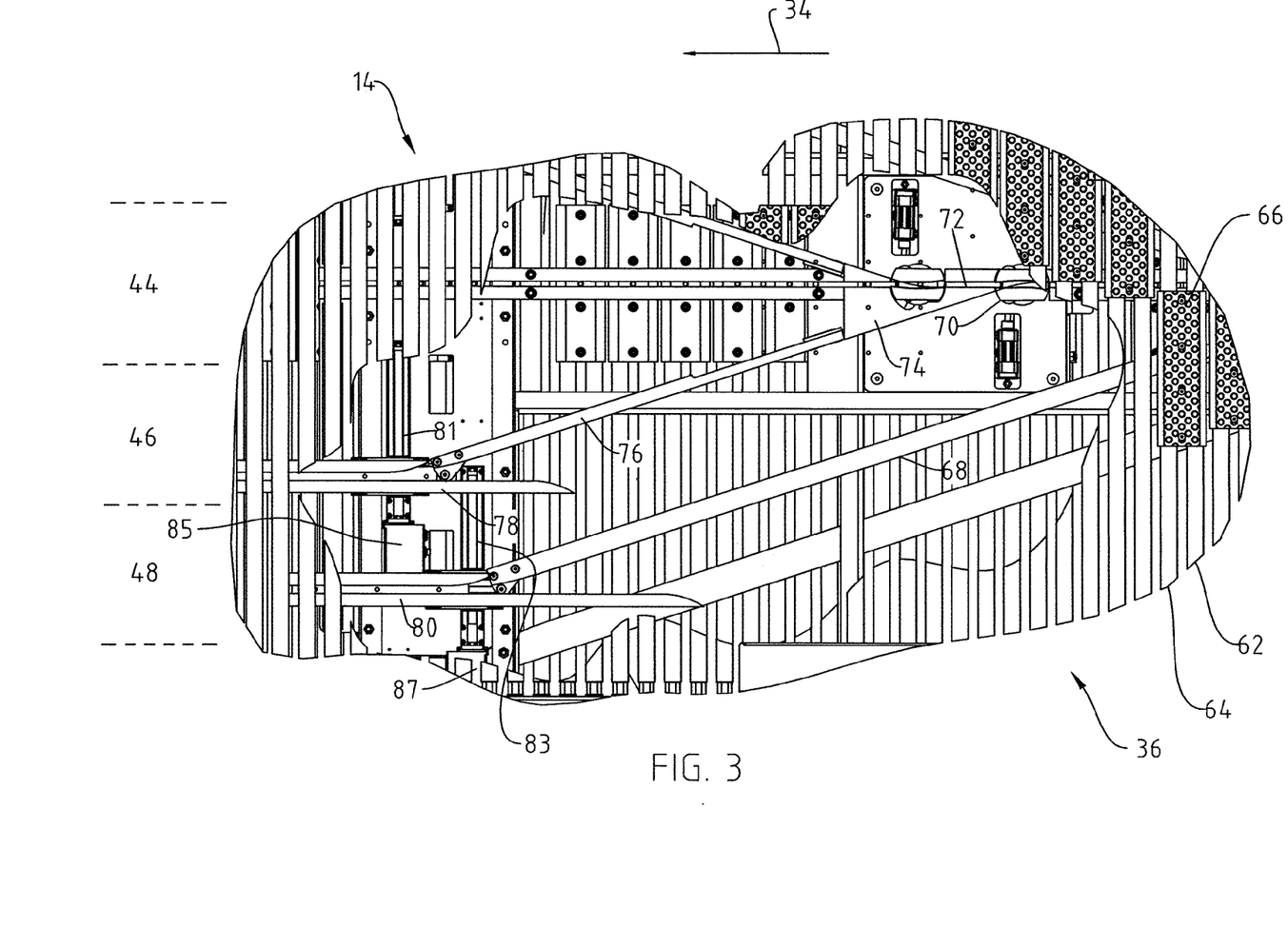
FIG. 3 is a magnification of the partial section of FIG. 2.

FIGS. 2 and 3 illustrate the features of the lane diverter 14 operative to move products from a single upstream lane to one of multiple downstream lanes. The diverter surface 36 includes an array of laterally aligned diverter tubes, such as tube 62, that move upstream to downstream in direction 34 along a track within the diverter frame 14 similar to movement of conveyor belts 20, 22 in conveyor 12. The tubes 62 are spaced from one another so as to form a gap therebetween as shown best in FIG. 3. Diverter slats or pads rest on two adjacent tubes, such as pad 66 resting between tubes 62 and 64. The pads 66 include a downwardly directed pin (not shown) that extends through the gap between the tubes 62, 64 and into the interior of the diverter frame 14. As shown best in FIG. 4, a plurality of tracks are positioned below the conveyor surface 36 and form a branching pattern from a single upstream track 50 to a plurality of downstream tracks 50, 52, 54, 56, and 58.

Figure 4:
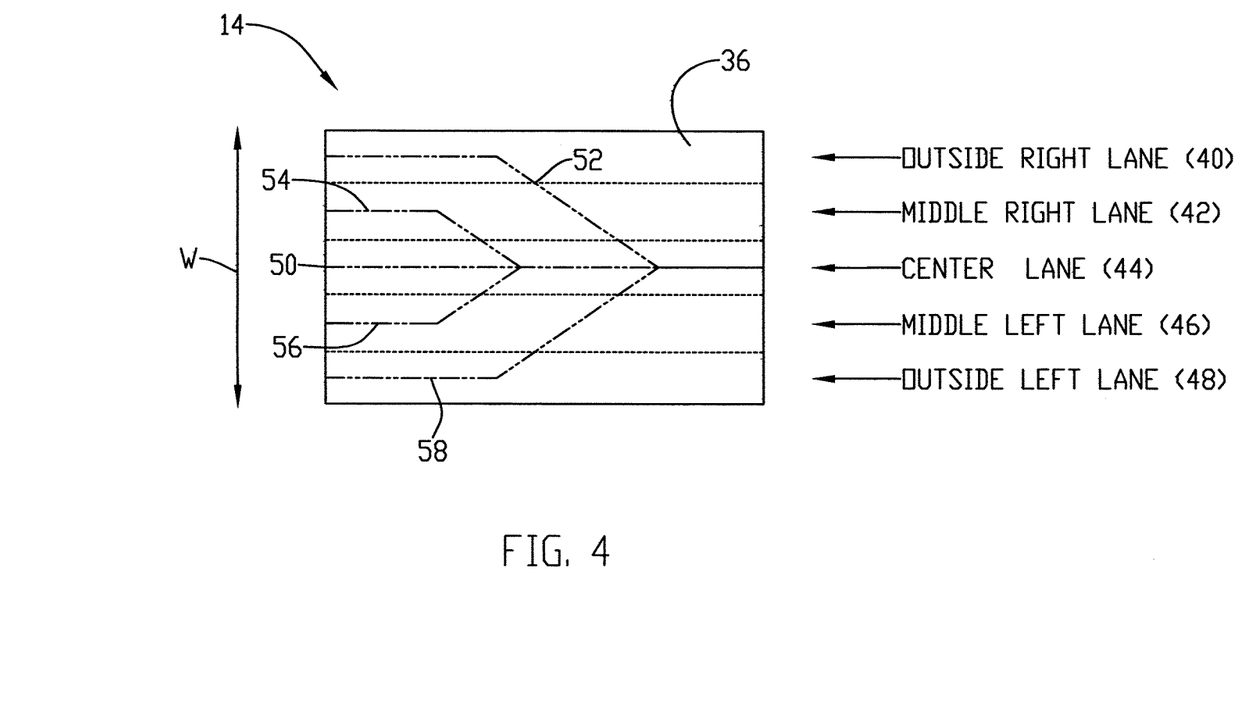
FIG. 4 is a plan view schematic showing multiple lanes of the diverter portion of the conveyor/palletizer assembly of FIG. 1.

To effect the branching of product to multiple paths, the downwardly directed pins on each of the product support pads 66 contact tracks or guide bars located beneath the conveyor surface 36. Guide bar 68 branches at an inclined angle from the upstream to downstream ends of the diverter so that the guide bar starts at a center lane position 44 near the upstream side and branches outward to the outside left lane 48. As the product support pad 66 moves with tubes 62, 64 toward the downstream end, the pin contacts the outer edge of the inclined guide bar 68 and is forced laterally to the direction of conveyor movement 34 so that the pad slides outward along the tubes 62, 64 as the tubes move forward. A product sitting on the pads 66 moves between lanes as the pads move forwardly and laterally.

Turning to FIG. 3, a diverter element under control of the workstation 60 activates to divert the pins and connected pads. For instance diverter switch 70 interposes a body within the center track 72 to divert the pin away from the center track 72 and toward, for instance, an outside edge of the middle-left guide block 74. Guide block 74 guides the pin along an oblique path to a direction 34 of conveyor travel via an outside edge of nylatron guide bar 76 and thence to middle-left track 78. Track 78 is preferably constructed as a pair of parallel and spaced guides or tracks. The pin of the support pad 66 is captured between the guides and runs parallel to conveyor direction 34 within a groove formed between the spaced tracks. A similar structure, upstream to diverter switch 70, can divert product from the center track 72 to the outside left track 80.

In a preferred embodiment, all downstream sections of the tracks are laterally moveable so that the conveyed products can be delivered at any lateral position W (FIG. 4) along the discharge of lane diverter assembly 14. Each downstream section of track 78, 80 includes a lateral guide section 81, 83 and actuator 85, 87 that moves a respective downstream track section transverse to the direction of conveyor movement 34 so that the output end can be infinitely positioned using a limited number of tracks and lanes. Center track 72 can be likewise positioned so that all five tracks 50, 52, 54, 56, 58 are infinitely positionable as desired. Operation of the actuators 85, 87 and movement of the tracks along the lateral guide sections 81, 83 is accomplished under computer control as dictated by the requested pattern operating on the workstation 60 (FIG. 1). That is, although five physical tracks 50, 52, 54, 56, and 58 are illustrated in the example shown in FIG. 4, lateral movement of the downstream ends of such tracks along width W can result in the creation of many more lanes than there are tracks. In fact, lateral placement of the cases along the conveyor can be made with nearly infinite precision and then appropriately turned by properly positioned turners as noted below.

In an alternate embodiment, the center and outside tracks adjacent the downstream end of the diverter 14 are fixed while the middle-left track 78 (and middle-right track) are transversely moveable relative to a direction of movement 34 of the conveyor so that a terminal end of the moveable track path can be positioned at a selected on of a plurality of possible positions. Movement of the moveable tracks 78 can be effected by actuator 85 coupled to the track 78 that pushes or pulls the track 78 into the desired lateral position while also changing the inclined angle of guide bar 76 coupled to an end of the track 78. Once moved to a specified lane as dictated under control of workstation 60, the products move along those lanes to the product turning assembly 16 such as that shown in FIGS. 5-6. The assembly 16 (FIG. 1) includes a framework 82 adapted to span over the conveyor on which products are moved along multiple lanes of the conveyor surface 84 from an upstream side adjacent the terminal end 38 of the diverter assembly 14 to a downstream end adjacent the palletizer platform 18. The span is preferably transverse to the direction of product movement 34 or long axis of the conveyor and is raised to a level above the conveyor surface 84 to a certain extent so that it does not interfere with passage of product on the conveyor except to turn certain selected ones as described below.

The turning apparatus 16 includes a plurality of turning assemblies 86, 88 spaced along the length framework 82. Turning assemblies 86, 88 include means for effecting both vertical and horizontal movement of downwardly extending turning shoes 92, 94 within the space 90 defined between the framework 82 and conveyor surface 84. Each of the turning shoes 92, 94 includes a turning surface facing upstream and adapted to contact a forward surface of product as the product moves downstream along the conveyor surface 84. To rotate product as it moves downstream along conveyor surface 84, the turning shoes 92, 94 are positioned off-axis to the forward surface of the product so as to act as a pivot point and cause the product to rotate around the now-stationary shoes while the product moves downstream. The turning surfaces preferably include a folded expanse such as that shown in FIG. 5 that bends around side edges of the shoes 92, 94 so that product impacting the forward surface is smoothly guided around the shoe without getting snagging on edges of the surface.

Figure 5:
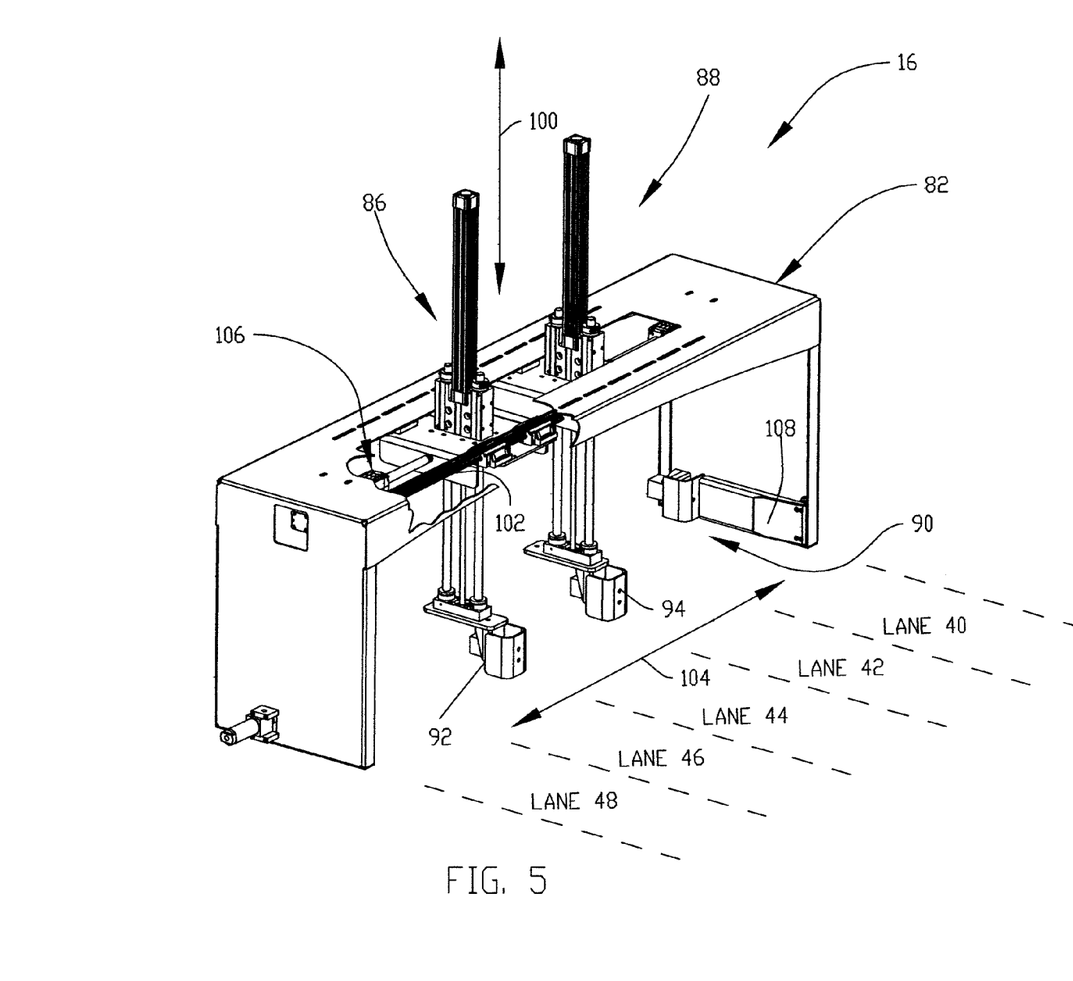
FIG. 5 is a perspective view of the configurable turner portion of FIG. 1 constructed according to embodiments of the invention, with a partial section showing the interior of the turner assembly.
Figure 6:
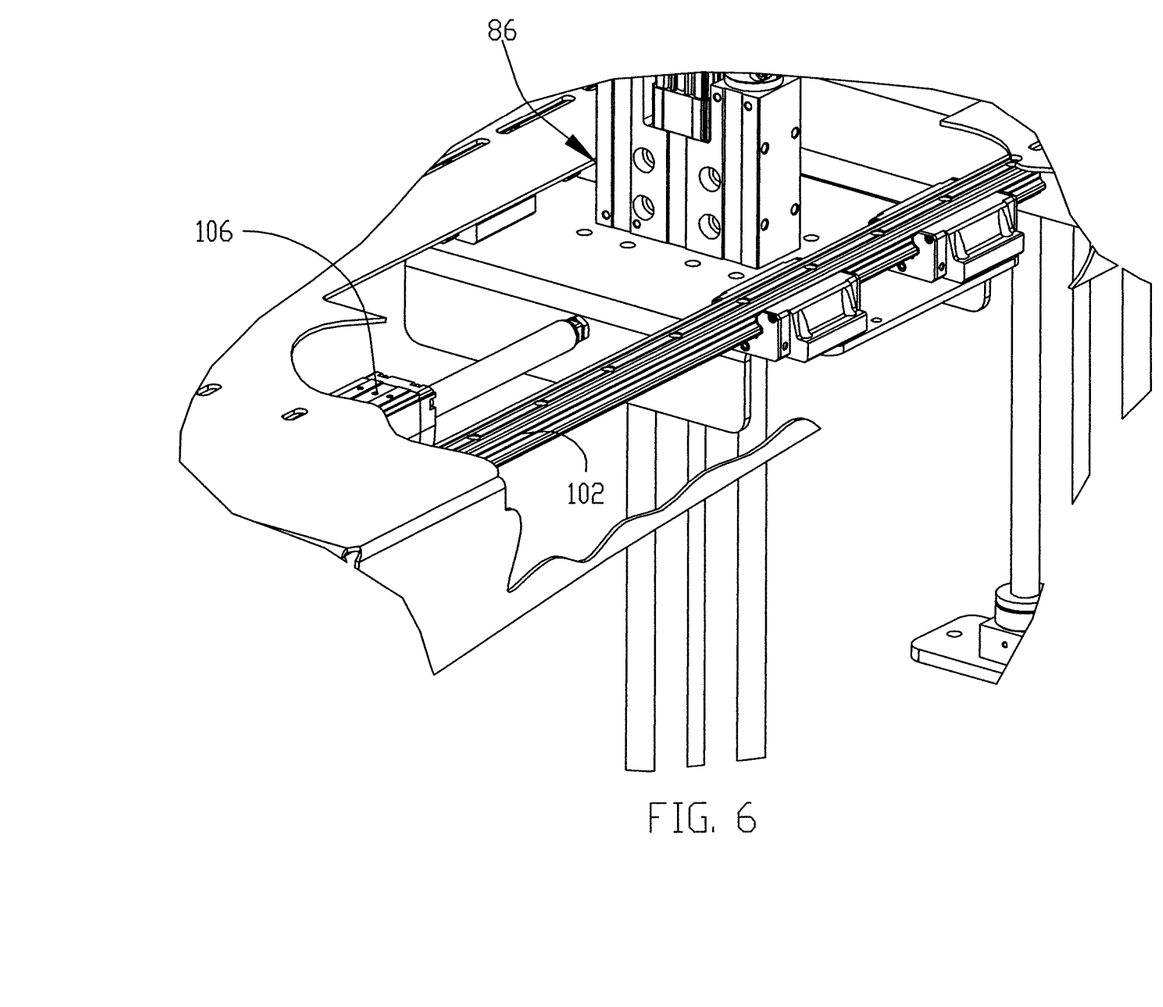
FIG. 6 is a magnified perspective view of the partial section of the configurable turner of FIG. 4.

For vertical movement of the turning shoes 92, 94, the turning assemblies 86, 88 each include a vertical actuator 96, 98 configured to move the shoes between raised inactive positions adjacent the spanning portion of the framework 82 and extended or lowered positions adjacent the conveyor surface 84. When a product to be turned is approaching the framework 82 within a specified lane 40, 42, 44, 46, 48, a designated shoe 92, 94 is lowered within that lane until level with the product. If that shoe is no longer needed, say if a second product passes within that same lane, then the respective actuator 96, 98 is activated under control of the workstation 60 and the shoe is lifted upward within the lane so that it is above the level of the product and would therefore not contact it.

For horizontal movement of the turning shoes 92, 94, the framework 82 includes a linear guide 102 suspended within the framework 82 above the surface 84 of the conveyor. The guide or track 102 is disposed at a right angle to a direction of travel 34 of products along the conveyor. The assemblies 86, 88 are adapted to move horizontally 104 along the track 102 between lanes 40, 42, 44, 46, 48 of the conveyor. A linear actuator, such as actuator 106 coupled to turning assembly 86, is activated under control of workstation 60 and pushes or pulls the turning assembly so that it moves along track 102 between lanes 40, 42, 44, 46, 48. Each turning assembly can have its own individually controllable linear actuator for independent movement of the assemblies with respect to one another. So long as a shoe 92 is lowered to a position at the level of the product to be turned, the shoe may be positioned to a desired lateral location and contact the product at the appropriate point—preferably about ⅓ along the front face of the product. When no longer needed, the shoe can be moved laterally to an inactive position so that it is located within a lane in which the product is not located.

Movement of the turning shoes 92, 94 between active and inactive positions can be accomplished in several ways. In one way, as described above, the vertical actuators lower the shoes 92, 94 into active position within the designated lane. In another way, the linear actuators moves the shoes 92 horizontally 104 to an active position within the lane of the product to be turned. Although each method works individually, it may be desired to move the shoes both horizontally and vertically depending upon the pattern desired, the height of the products, and the speed at which the conveyor moves.

It is preferred that there are fewer turning assemblies than lanes. In the present example, there are two turning assemblies 86, 88 but five lanes 40, 42, 44, 46, 48. Each of the assemblies may be associated with several lanes—such as assembly 86 associated with middle and left lanes 44, 46, and 48; and assembly 88 associated with the right-side lanes 42, 40—and it is possible for both assemblies to be associated with the same lane—e.g. center lane 44. For instance, it may be that shoe 92 would need to be positioned within outside-left lane 48 with the following product needing to be turned in center lane 44. In this instance, and given the speed of the conveyor, there may not be time to move shoe 92 laterally from lane 48 to lane 44 before the next product arrives. Shoe 94 would then be designated as the active turning surface for lane 44 for this step in the pattern-formation process. If, however, a following product to be turned arrives in far-right lane 40, then there may not be time to move shoe 94. In this case, there may be supplemental turning devices, such as side turn shoe 108, disposed on the outside expanse of framework 82 that rotate out into the side lane 40 and impact a corner of the product to thereby turn it. Alternately, workstation 60 can be programmed to reduce the speed of the conveyor 84 in order to give shoe 94 a chance to move over to the correct lane.

FIGS. 7A-7C illustrate construction of a first, five-case palletizing pattern by the palletizing/conveyor assembly 10 under control of the workstation 60. Products, such as boxes 110 move along conveyor 12 along a single, central lane and empty into the central lane of diverter 14. Diverter 14 then moves the products from the central lane to one of a plurality of downstream lanes arrayed along a downstream width of the conveyor. While the product is being diverted from the single upstream lane to one of the plurality of downstream lanes, a turning assembly 86 is moved along a downstream width—such as along linear guide 102—under computer control 60 and responsive to the desired palletizing pattern so that a turning surface of the turning device is interposed within a selected one of the downstream lanes. When properly positioned within the lane of the product to be turned, the turning surface contacts the leading face of the product off-axis to the central axis of the product. In FIG. 7A, the shoe 92 of assembly 86 contacts box 112 off-axis to its central axis 114. Because the bottom surface of the box is still being driven by the conveyor surface 84, the box moves forward but pivots around the shoe so that the central axis turns ninety degrees until it is transverse to the direction of movement 34. So turned, box 112 now moves to the palletizing surface 18 where it completes the five-box pattern shown in FIG. 7B.

FIG. 7C illustrates the step-wise instructions of the pattern-forming computer control for an exemplary five-box layer pattern. For case run #1, a first box is moved by diverter 14 to an outside left lane 48. Because this box need not be turned, the turning assemblies 86, 88 are maintained in an up/inactivate position. The first box, now moved to lane 48, then slides to the back of the palletizer surface in the desired lengthwise orientation. For case run #2, the second box is maintained within the center lane 44 by diverter and, since this box also is not turned, the turner assemblies are inactive. For case run #3, the third box is moved by diverter 14 to an outside right lane 40 and again not turned. For case run #4, the fourth box is moved by diverter 14 to the outside right lane 40. Because this box must be turned so that its lateral edge lines up with the longitudinal outer edge of the third box, turning assembly 88 is moved to a designed lateral position—here position '12' out of 15 step-wise positions—and dropped so that shoe 94 extends into the outside right lane level with the fourth box. Upon contact with the shoe 94, the box rotates ninety degrees so that it now moves sideways down the conveyor and to the layer assembly area of palletizing platform 18. The shoe 94 is then retracted upward to the inactive position after a designated time. For case run #5, the fifth box is moved by diverter 14 to the outside left lane 48. This box must be turned so that its lateral edge lines up with the longitudinal outer edge of the first box. Turning assembly 86 is thus moved to a designated lateral position—here position '12' out of 15 step-wise positions—and dropped so that shoe 92 extends into the outside left lane level with the fifth box. Upon contact with the shoe 92, the box rotates ninety degrees to that it now moves sideways down the conveyor to the layer assembly area of palletizing platform and completes the layer shown in FIG. 7B. The completed layer is dropped onto a pallet and the process starts again with another layer, this time with the process going in reverse so that the longitudinal boxes are placed first and then the horizontal boxes. In this fashion, alternating layers of boxes overlap adjacent layers so that the resulting multi-layer pallet is stabilized.

Figures 8A, 8B:
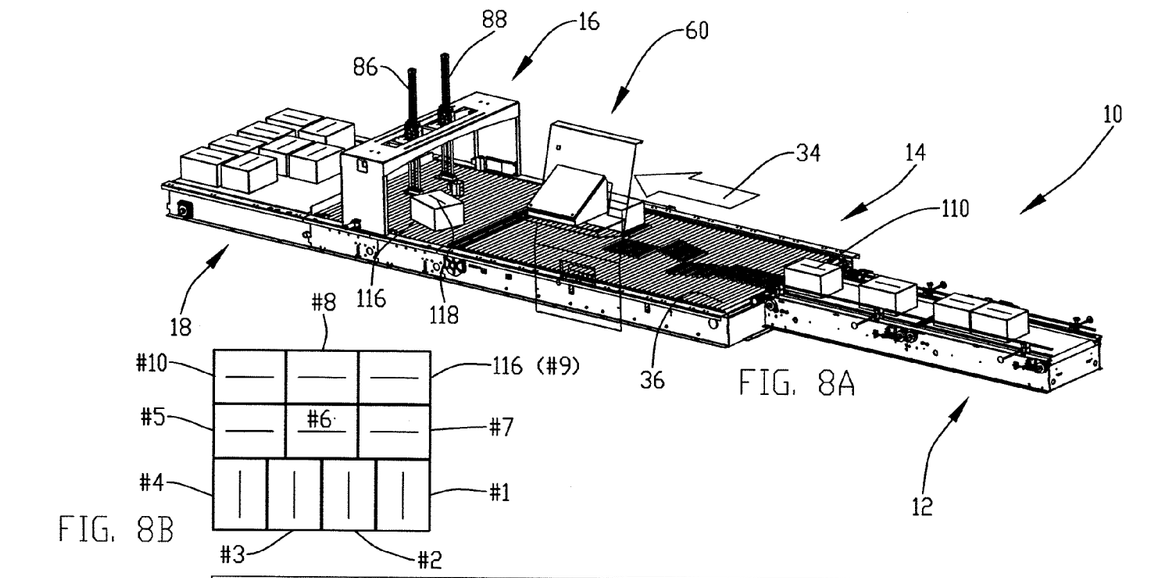
FIGS. 8A-8C show a perspective view of the palletizing assembly in operation to form the illustrated 10-case pattern using the instructions table shown.
Figure 8C:
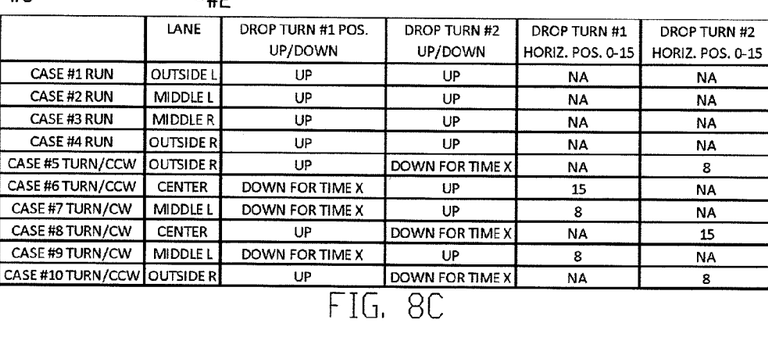

FIGS. 8A-8C illustrate construction of a second, ten-case palletizing pattern by the palletizing/conveyor assembly 10 under control of the workstation 60. Products, such as boxes 110 move along conveyor 12 along a single, central lane and empty into the central lane of diverter 14. Diverter 14 then moves the products from the central lane to one of a plurality of downstream lanes arrayed along a downstream width of the conveyor. While the product is being diverted from the single upstream lane to one of the plurality of downstream lanes, a turning assembly 86 is moved along a downstream width—such as along linear guide 102—under computer control 60 and responsive to the desired palletizing pattern so that a turning surface of the turning device is interposed within a selected one of the downstream lanes. When properly positioned within the lane of the product to be turned, the turning surface contacts the leading face of the product off-axis to the central axis of the product. In FIG. 8A, the shoe 92 of assembly 86 contacts box 116 off-axis to its central axis 118. Because the bottom surface of the box is still being driven by the conveyor surface 84, the box moves forward but pivots around the shoe so that the central axis now turns ninety degrees and is now transverse to the direction of movement 34. So turned, box 116 now moves to the palletizing surface 18 where it forms the ninth case in a ten-case pattern as shown in FIG. 8B.

FIG. 8C illustrates the step-wise instructions of the pattern-forming computer control for an exemplary ten-box layer pattern. For case run #1, a first box is moved by diverter 14 to an outside left lane 48. Because this box need not be turned, the turning assemblies 86, 88 are maintained in an up/inactivate position. The first box, now moved to lane 48 then slides to the back of the palletizer surface in the desired lengthwise orientation. For case run #2, the second box is moved to middle-left lane 46 by diverter 14 with the middle-left track (FIG. 3) moved to the proper position to accommodate the proper placement of the case within the pattern. As box #2 is not to be turned, the turner assemblies are inactive. For case run #3, the third box is moved to the middle-right lane 42 by diverter 14 with the middle-right track moved to the proper position so that the case slides next to case #2. Again, box #3 is not to be turned so that the turning assembly is inactive. For case run #4, the fourth box is moved by diverter 14 to an outside right lane 40 and again not turned. This completes the first row of cases.

The remaining cases in the pattern of FIG. 8B need to be turned sideways, thus requiring the turning assembly to be active. For case run #5, the fifth box is moved by diverter 14 to the outside right lane 40. Because this box must be turned so that its lateral edge lines up with the longitudinal outer edge of the fourth box, turning assembly 88 is moved to a designed lateral position—here position '8' out of 15 step-wise positions—and dropped so that shoe 94 extends into the outside right lane level with the fifth box. Upon contact with the shoe 94, the box rotates ninety degrees so that it now moves sideways down the conveyor and to the layer assembly area of palletizing platform 18. The shoe 94 is then retracted upward to the inactive position after a designated time. For case run #6, the sixth box remains in the center lane so is not diverted by diverter 14. The sixth box needs to be turned, however, so turning assembly 86 is thus moved downward and laterally to its far position '15' so as to turn the sixth box 90 degrees and have its edge line up adjacent the side edge of the just-placed fifth box. For case run #7, the seventh box is moved by diverter 14 to the middle left lane 46 and the turning assembly 86 moved into that lane, either by lifting it from the center lane in the previous step, moving it laterally, and dropping it into lane 46 or simply moving the assembly 86 laterally to position '8' without first placing it in an inactive position. The seventh box then impacts the contact surface of turning shoe 92 and the box rotates ninety degrees so that its outer edge lines up with the outer edge of the first box. The second row is now complete.

For the third row, case run #8 operates to move an eighth case down the conveyor, maintain it within the center lane 44, and turn it sideways using shoe 94 located at position '15'. Case run #9 then operates to move the ninth box to the middle-left row 46, and turn the case with shoe 92 at position '8' as shown in FIG. 8A with the turning of box 116. The final case in the layer is then moved downstream through the system 10 along the outside right lane 40 and then turned sideways using shoe 94 at position '8'. The completed layer can then be dropped onto a pallet and a new layer constructed with a different pattern opposite to the 10-case layer so that the two rows of sideways cases are loaded and then the last row of longitudinal cases so that seams are overlapped and the resulting pallet stack is more stable. In this way, the turning surface of the shoe may be moved to a different lane response to computer control operating to construct a second, e.g. opposite, palletizing pattern.

Having described and illustrated the principles of the invention in a preferred embodiment thereof, it should be apparent that the invention can be modified in arrangement and detail without departing from such principles. We claim all modifications and variation coming within the spirit and scope of the invention.

What is claimed is:

1. A dynamically adjustable product turning apparatus comprising:
   a framework configured to span over a conveyor that moves product along multiple lanes of a conveyor surface from an upstream side to a downstream side;
   a plurality of turning devices spaced along the framework and moveable between an inactive position to an active turning position within a selectable lane of the product to be turned;
   an actuator coupled to each of the plurality of turning devices; and
   computer control coupled to the actuator and to the turning devices and having a programmed pattern in memory for moving each of the turning devices along the framework and between inactive and active positions,
   wherein the turning devices are configured to move vertically between inactive and active positions so that the inactive position is a retracted position adjacent the framework and the active position is an extended position adjacent the conveyor surface, and
   wherein the framework is configured to span across the conveyor transversely to a long axis of the conveyor, the turning devices laterally moveable along the framework and transversely to a long axis of the conveyor so that a downwardly extended position of the turning devices can contact a selected portion of a front face of the product moving along the conveyor.

2. The apparatus of claim 1, wherein the turning devices are configured to move horizontally along the framework between presently inactive lanes in which there is no product to be turned and presently active lanes in which there is a product to be turned.

3. The apparatus of claim 1, wherein the computer control is configured to move the turning devices between lanes of the conveyor.

4. The apparatus of claim 1, wherein there are fewer turning devices than lanes of the conveyor.

5. A dynamically adjustable product turning apparatus comprising:
   a framework configured to span over a conveyor that moves product along multiple lanes of a conveyor surface from an upstream side to a downstream side;
   a plurality of turning devices spaced along the framework and moveable between an inactive position to an active turning position within a selectable lane of the product to be turned;
   an actuator coupled to each of the plurality of turning devices; and
   computer control coupled to the actuator and to the turning devices and having a programmed pattern in memory for moving each of the turning devices along the framework and between inactive and active positions, the framework further including a track disposed at a right angle to a direction of travel of products along the conveyor, wherein the turning devices are configured to move along the track between lanes of the conveyor.

6. A flexible pattern-forming palletizing apparatus comprising:
   a conveyor having an upstream end for receiving products along a single lane and a downstream end having a plurality of lanes arrayed along a width of the downstream end;
   a diverter positioned between the upstream and downstream end for moving the products from the single lane into selected ones of the plurality of lanes as the products move from the upstream end to the downstream end of the conveyor;
   a product turner positioned downstream of the diverter for receiving products positioned in the plurality of lanes and turning selected ones under control of a computer responsive to a desired palletizing pattern, said product turner having turning devices that move between lanes under control of the computer.

7. The palletizing apparatus of claim 6, wherein the diverter includes:
   a conveyor surface running upstream to downstream;
   a support surface projecting above the conveyor surface and moveable with the conveyor surface upstream to downstream;
   a plurality of track paths positioned below the conveyor surface forming a branching pattern from a single upstream track to a plurality of downstream tracks.

8. The palletizing apparatus of claim 7, wherein the plurality of track paths includes a plurality of moveable track paths having terminal downstream ends transversely moveable relative to a direction of movement of the conveyor so that each of the terminal ends of the moveable track paths can be positioned at a plurality of possible positions.

9. The palletizing apparatus of claim 8, wherein the plurality of track paths includes a fixed center path and fixed outside paths and the moveable track paths including a moveable track path positioned between the center path and each outside path.

10. The palletizing apparatus of claim 8, wherein the plurality of moveable track paths includes all of the plurality of track paths.

11. The palletizing apparatus of claim 10, wherein the plurality of moveable track paths are transversely moveable to any one of a plurality of lateral positions.

12. A method for turning product moving along a conveyor comprising the steps of:
   moving product from an upstream section of the conveyor to a downstream section;
   diverting product from a single upstream lane to one of a plurality of downstream lanes arrayed along a downstream width of the conveyor;
   while the product is being diverted from the single upstream lane to one of the plurality of downstream lanes, moving a turning device along a downstream width of the conveyor under computer control responsive to a desired palletizing pattern so that a turning surface of the turning device is interposed within a selected one of the downstream lanes; and
   contacting the turning surface of the turning device with the product to be turned at a product contact position that is off-axis to a central axis of the product.

13. The method of claim 12, further including the step of activating the turning device under computer control to descend from a retracted, non-turning position to a downwardly extended position.

14. The method of claim 12, further including the steps of:
   under computer control, moving the turning surface to a different lane; and
   contacting the turning surface of the turning device with a second product to be turned moving within a second selected one of the downstream lanes.

15. The method of claim 14, wherein the step of moving the turning surface to a different lane includes moving the turning surface responsive to a second desired palletizing pattern.

16. The method of claim 12, wherein the step of diverting the product includes moving the product along one of a finite number of tracks and laterally moving a downstream end of the track to any one of a plurality of lateral positions.

17. The method of claim 12, further including the step of moving a second turning device along a downstream width of the conveyor under computer control responsive to the desired palletizing pattern so that a turning surface of the second turning device is interposed within a different selected one of the downstream lanes.

18. The method of claim 17, wherein the step of moving the turning device and second turning device include laterally moving each of the turning device and second turning device to any one of a plurality of selectable positions within each of the downstream lanes.

* * * * *